(12) United States Patent
Hayes

(10) Patent No.: US 8,740,293 B1
(45) Date of Patent: Jun. 3, 2014

(54) CLAMSHELL ACOUSTIC INSULATOR ASSEMBLY FOR A PASSENGER COMPARTMENT OF A VEHICLE

(71) Applicant: GM Global Technology Operations LLC, Detroit, MI (US)

(72) Inventor: Joseph Hayes, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/747,518

(22) Filed: Jan. 23, 2013

(51) Int. Cl.
*B60J 7/00* (2006.01)

(52) U.S. Cl.
USPC .......................................... 296/208

(58) Field of Classification Search
USPC ......... 296/208, 39.3; 181/141, 150, 208, 285, 181/290, 294; 381/71.4, 86
See application file for complete search history.

(56) References Cited

U.S. PATENT DOCUMENTS

| | | | | |
|---|---|---|---|---|
| 4,463,049 A | * | 7/1984 | Kracke | 442/120 |
| 4,574,915 A | * | 3/1986 | Gahlau et al. | 181/290 |
| 4,705,139 A | * | 11/1987 | Gahlau et al. | 181/290 |
| 5,483,028 A | * | 1/1996 | Holwerda | 181/207 |
| 5,876,826 A | * | 3/1999 | Hoffmann et al. | 428/95 |
| 5,979,962 A | * | 11/1999 | Valentin et al. | 296/37.1 |
| 6,695,374 B1 | * | 2/2004 | Gebreselassie et al. | 296/24.3 |
| 7,017,250 B2 | * | 3/2006 | Gebreselassie et al. | 29/428 |
| 7,055,649 B2 | * | 6/2006 | Tompson et al. | 181/290 |
| 8,366,170 B2 | * | 2/2013 | Glickman | 296/39.3 |
| 8,371,635 B2 | * | 2/2013 | Mizata | 296/39.3 |
| 2003/0096079 A1 | * | 5/2003 | Messina et al. | 428/85 |
| 2004/0055813 A1 | * | 3/2004 | Tsuiki et al. | 181/204 |
| 2004/0075290 A1 | * | 4/2004 | Campbell | 296/39.3 |
| 2004/0188158 A1 | * | 9/2004 | Gebreselassie et al. | 180/89.1 |
| 2004/0207228 A1 | * | 10/2004 | Gebreselassie et al. | 296/70 |
| 2008/0144852 A1 | * | 6/2008 | Rebandt et al. | 381/71.8 |
| 2012/0043779 A1 | * | 2/2012 | Glickman | 296/39.3 |

* cited by examiner

*Primary Examiner* — Kiran B Patel
(74) *Attorney, Agent, or Firm* — Quinn Law Group, PLLC

(57) ABSTRACT

An acoustic insulator assembly for disposition adjacent a rear wall of a vehicle body, between the rear wall and a trim panel includes a substrate formed as a single unit from an acoustic fiber. The substrate includes a first portion, a second portion and a living hinge interconnecting the first portion and the second portion. The second portion is rotated about the living hinge into interlocking engagement with the first portion to define at least one air pocket with at least one baffle. The air pocket and the baffle limiting sound intrusion between a pressure relief valve in the wall of the body and a passenger compartment of the vehicle.

8 Claims, 4 Drawing Sheets

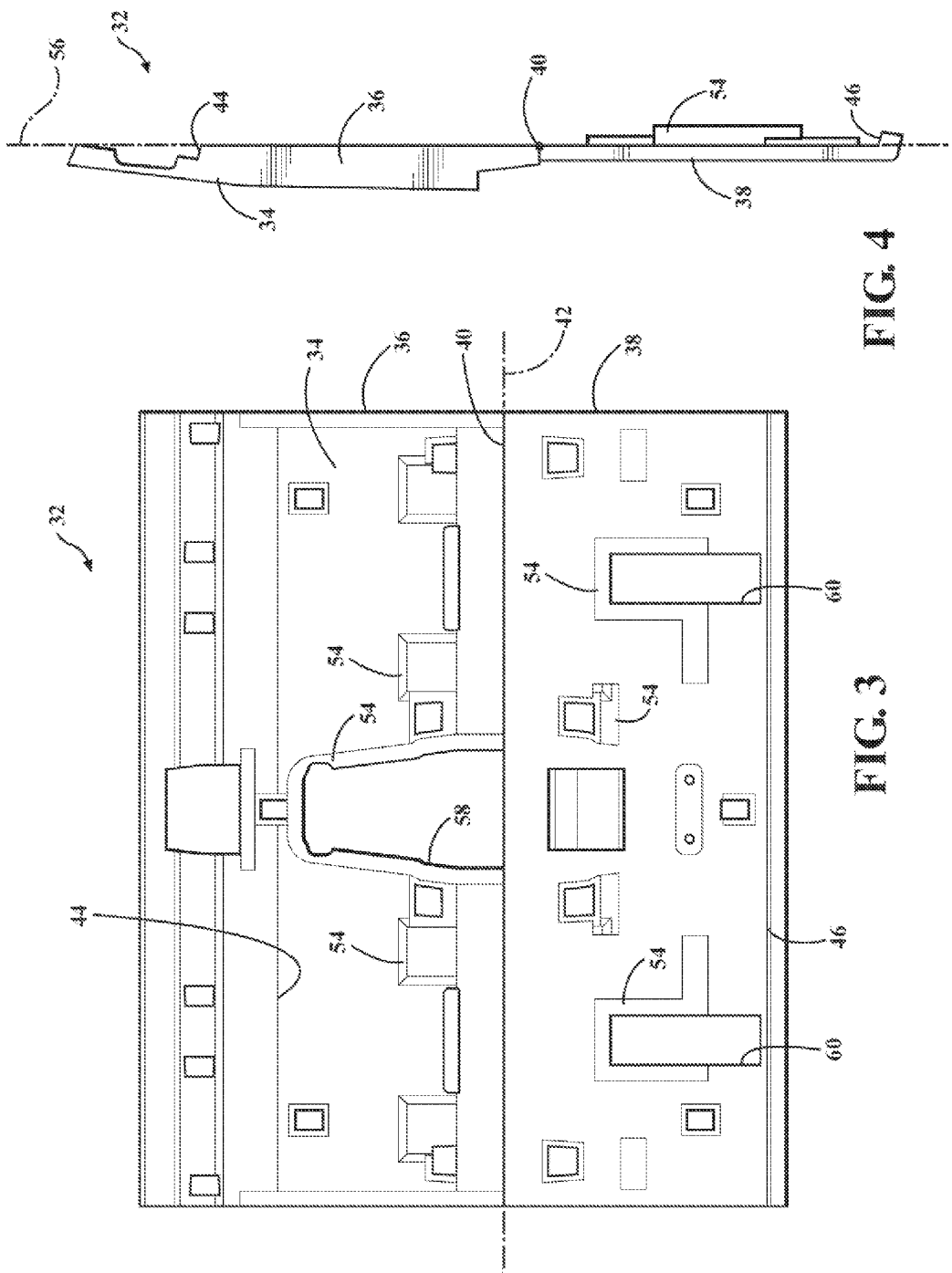

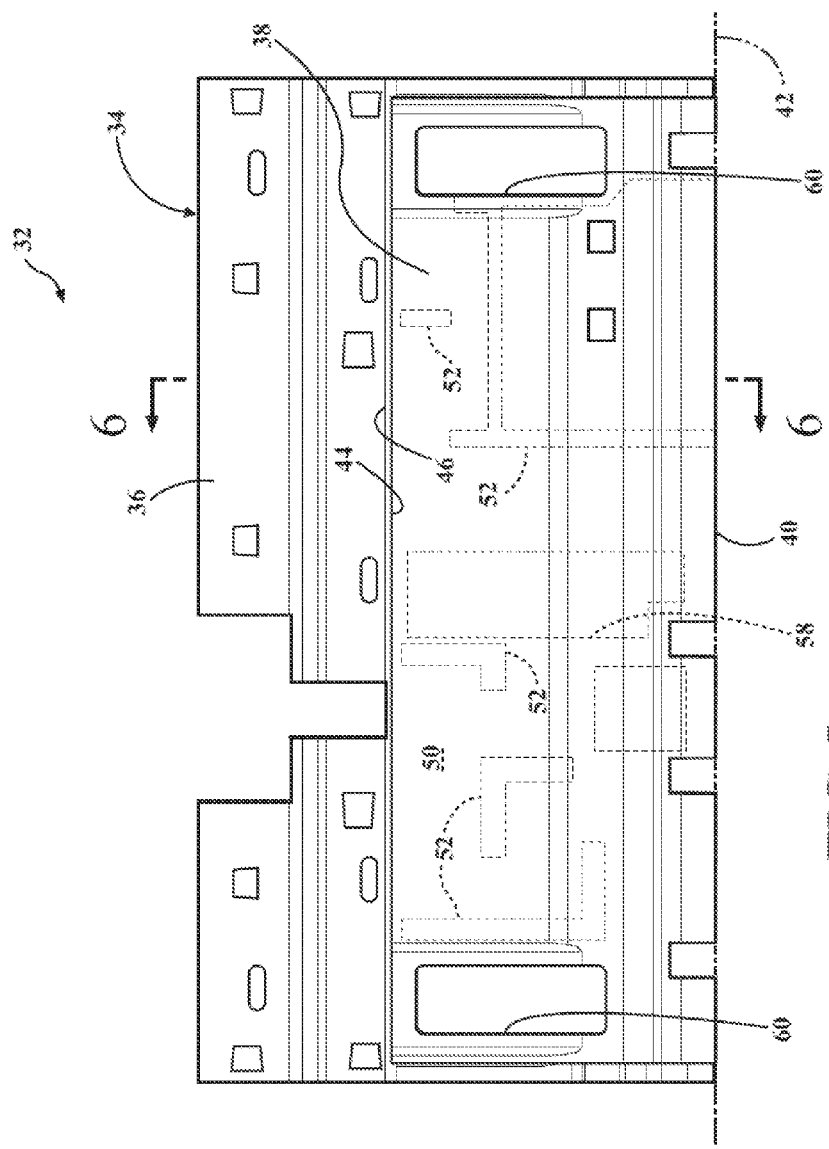
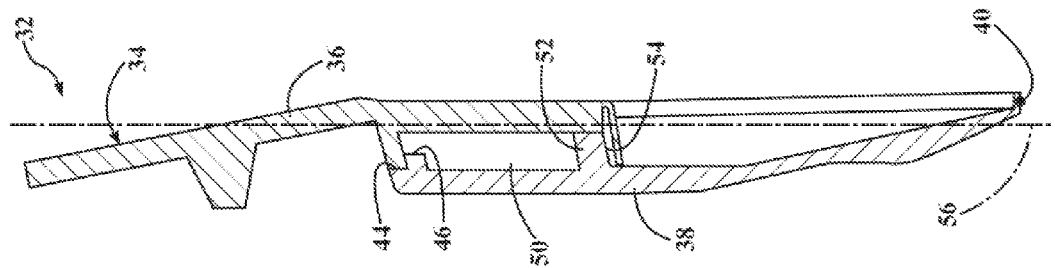
FIG. 5
FIG. 6

US 8,740,293 B1

CLAMSHELL ACOUSTIC INSULATOR ASSEMBLY FOR A PASSENGER COMPARTMENT OF A VEHICLE

TECHNICAL FIELD

The invention generally relates to an acoustic insulator assembly for limiting noise infiltration into a passenger compartment of a vehicle through a wall of the vehicle body.

BACKGROUND

Vehicles include a body that defines a passenger compartment. One wall of the body will include a pressure relief valve for venting air from within the passenger compartment to outside the body when the air pressure within the passenger compartment is greater than atmospheric pressure, such as occurs when an HVAC system circulates air from outside the body into the passenger compartment, or when rapidly closing a door of the vehicle. An acoustic insulator may be positioned adjacent the wall, between the wall and an interior trim panel, in order to prevent noise infiltration through the wall and through the pressure relief valve into the passenger compartment.

SUMMARY

A vehicle is provided. The vehicle includes a body having a wall that at least partially defines a passenger compartment. A pressure relief valve is mounted to the wall for venting air from the passenger compartment to outside of the body. A trim panel is attached to the body, adjacent an interior surface of the wall and within the passenger compartment. An acoustic insulator assembly is disposed between the wall and the trim panel. The acoustic insulator assembly includes a first portion, a second portion and a living hinge interconnecting the first portion and the second portion. The second portion is rotated about the living hinge into interlocking engagement with the first portion to define at least one air pocket with at least one baffle for limiting sound intrusion into the passenger compartment through the wall of the body and through the pressure relief valve.

An acoustic insulator assembly for disposition adjacent a rear wall of a vehicle body, between the rear wall and a trim panel is also provided. The acoustic insulator assembly includes a substrate formed as a single unit from an acoustic fiber. The substrate includes a first portion, a second portion and a living hinge interconnecting the first portion and the second portion. The second portion is rotated about the living hinge into interlocking engagement with the first portion to define at least one air pocket with at least one baffle for limiting sound intrusion.

Accordingly, the acoustic insulator assembly is formed as a single unitary substrate from an acoustic fiber material. The substrate is formed to define both the first portion and the second portion thereof, with the second portion being rotated about the living hinge into position against the first portion to define a clamshell configuration. When the second portion is rotated into position against the first portion, the acoustic insulator assembly defines the air pocket and baffles, which connect the pressure relief valve with the passenger compartment of the vehicle. The air pocket and the baffles deflect and/or deaden noise passing from outside the vehicle into the passenger compartment through the pressure relief valve, while the acoustic fiber of the acoustic insulator assembly deadens and/or absorbs noise passing through the wall of the vehicle into the passenger compartment.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic plan view of an acoustic insulator assembly in a pre-installation configuration.

FIG. 4 is a schematic side view of the acoustic insulator assembly in the pre-installation configuration.

FIG. 5 is a schematic plan view of the acoustic insulator assembly in an installation configuration.

FIG. 6 is a schematic cross sectional view, taken along cut line 6-6 shown in FIG. 5, of the acoustic insulator assembly in the installation configuration.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
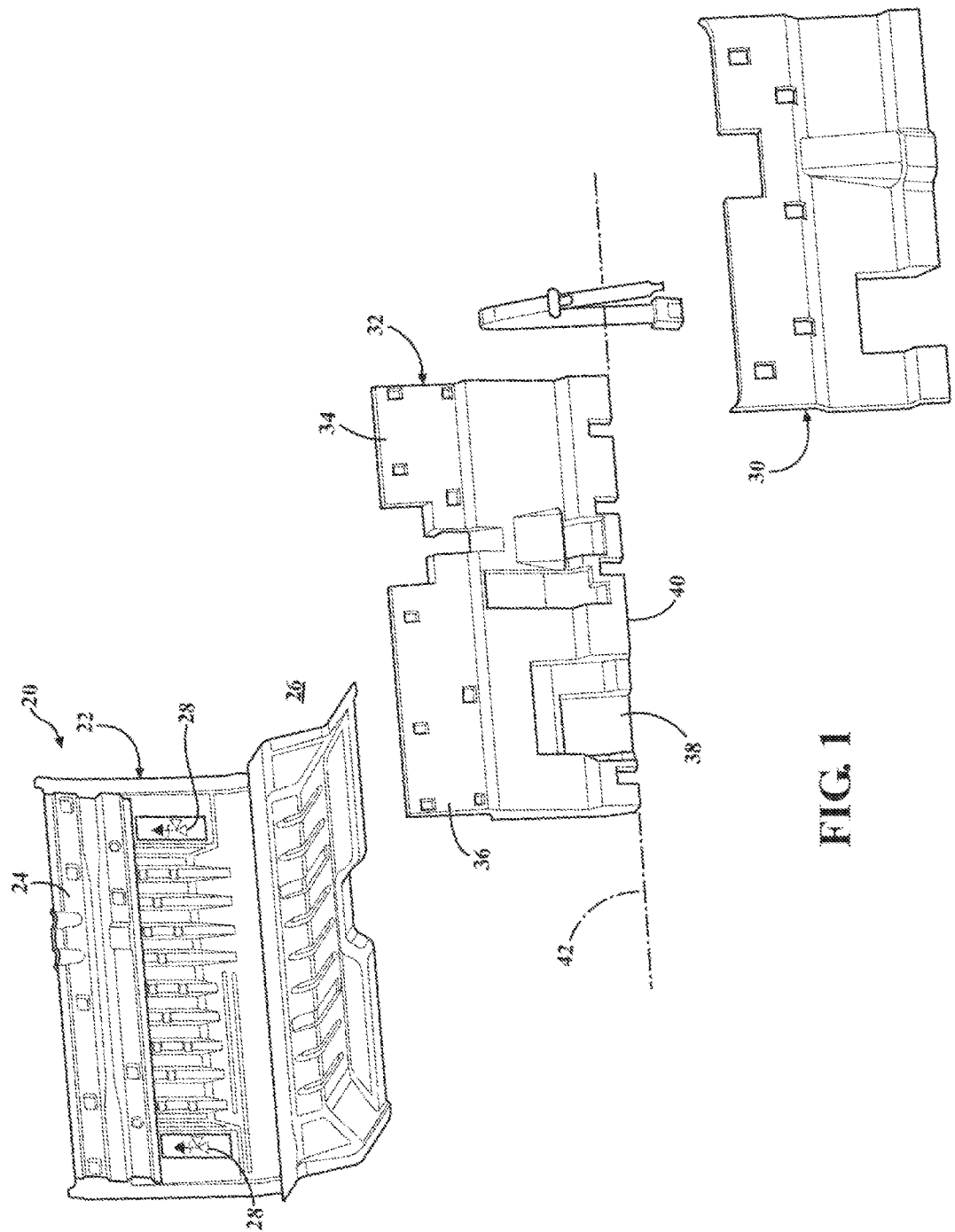
FIG. 1 is a schematic perspective exploded view of a body of a vehicle.
Figure 2:
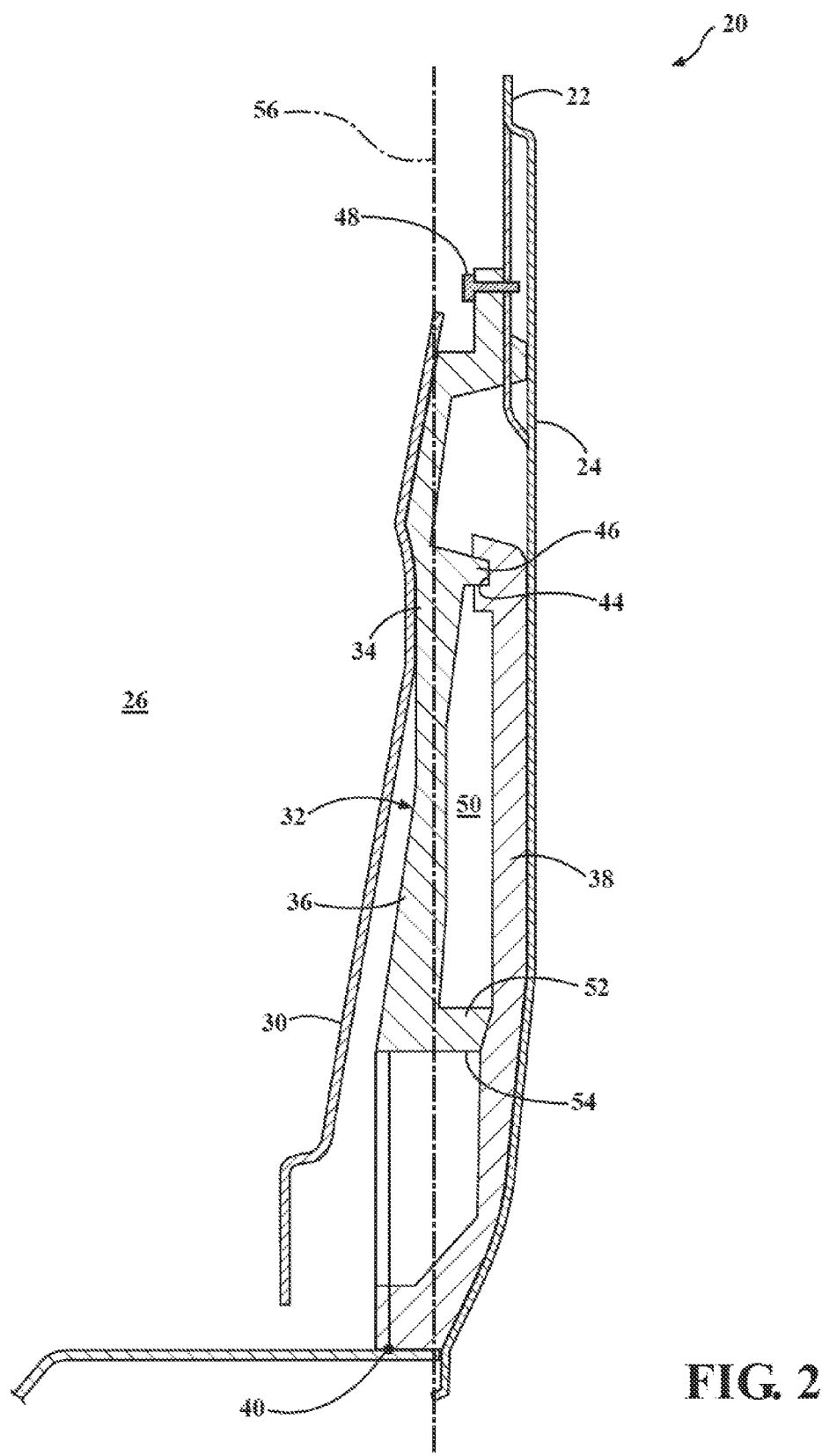
FIG. 2 is a schematic fragmentary cross sectional view of the vehicle.

Referring to the Figures, wherein like numerals indicate like parts throughout the several views, a vehicle is generally shown at 20. Referring to FIGS. 1 and 2, the vehicle 20 includes a body 22 having a wall 24 that at least partially defines a passenger compartment 26. As shown, the body 22 represents the rear cab wall of a pick-up truck. However, it should be appreciated that the wall 24 may be positioned at some other location of the body 22. The vehicle 20 includes a pressure relief valve 28 that is mounted to the wall 24. The pressure relief valve 28 vents air from the passenger compartment 26 to outside of the body 22 of the vehicle 20. The pressure relief valve 28 vents air from the passenger compartment 26 when the air pressure within the passenger compartment 26 is greater than atmospheric pressure. A trim panel 30 is attached to the body 22 adjacent an interior surface of the wall 24, within the passenger compartment 26. The trim panel 30 may be configured and attached to the wall 24 in any desirable manner.

An acoustic insulator assembly 32 is disposed between the wall 24 and the trim panel 30 to limit or minimize sound intrusion into the passenger compartment 26, through the wall 24 of the body 22 and through the pressure relief valve 28. The acoustic insulator assembly 32 is formed from and includes an acoustic fiber. The acoustic fiber may include, but is not limited to, a synthetic spun fiber or a cotton resonated fiber.

Referring to FIGS. 3 and 4, the acoustic insulator assembly 32 is formed as a single unit to define a substrate 34 disposed substantially along a plane 56. The substrate 34 includes a first portion 36, a second portion 38 and a living hinge 40. The living hinge 40 interconnects the first portion 36 and the second portion 38. FIGS. 3 and 4 show the acoustic insulator assembly 32 as formed in a pre-installation configuration. Referring to FIGS. 5 and 6, the living hinge 40 allows the second portion 38 to rotate about an axis 42 into interlocking engagement with the first portion 36. FIGS. 5 and 6 represent the acoustic insulator assembly 32 with the second portion 38 rotated into engagement with the first portion 36 to define an installation configuration, ready for installation into the vehicle 20.

Referring to FIGS. 4 and 6, the first portion 36 defines at least one attachment depression 44, and the second portion 38 defines at least one attachment notch 46. The attachment notch 46 of the second portion 38 is sized to tightly fit within the attachment depression 44 of the first portion 36 to define the interlocking engagement between the first portion 36 and the second portion 38. When the second portion 38 is rotated about the axis 42 of the living hinge 40 into engagement with the first portion 36, the attachment notch 46 nests with the attachment depression 44 in frictional engagement to secure the second portion 38 relative to the first portion 36. Preferably, the attachment depression 44 and the attachment notch 46 are elongated to substantially span a width of the acoustic insulator assembly 32. However, it is contemplated that the acoustic insulator assembly 32 may include multiple smaller sets of the attachment depressions 44 and attachment notches 46.

Referring to FIG. 2, when positioned within the passenger compartment 26 of the vehicle 20, the first portion 36 is positioned against the trim panel 30, and the second portion 38 is positioned against the wall 24, between the first portion 36 and the wall 24. The acoustic insulator assembly 32 is attached to the wall 24 via a plurality of fasteners 48. The plurality of fasteners 48 may include but are not limited to, push pin fasteners. However, it should be appreciated that other styles and/or types of fasteners 48 may be used to attach the acoustic insulator assembly 32 to the wall 24 of the body 22.

Referring to FIGS. 5 and 6, the second portion 38 is rotated about the living hinge 40 into abutting engagement with the first portion 36 to define a clamshell configuration, suitable for installation into the vehicle 20. When in the clamshell configuration, the first portion 36 and the second portion 38 cooperate to define at least one air pocket 50 with at least one baffle 52. The baffle 52 is configured to deflect and minimize the flow of noise through the air pocket 50. Accordingly, the air pocket 50 and the baffle 52 operate to limit sound intrusion into the passenger compartment 26 through the wall 24 of the body 22, and through the pressure relief valve 28.

Referring to FIGS. 4 and 6, at least one of the first portion 36 and the second portion 38 define at least one three dimensional baffling feature 54. The three dimensional baffling feature 54 extends away from a plane 56 of the substrate 34. When the second portion 38 is rotated into interlocking engagement with first portion 36 about the living hinge 40, the three dimensional baffling feature 54 at least partially forms the baffle 52. The three dimensional baffling features 54 are formed with the substantially planar substrate 34 so that when the second portion 38 is rotated into engagement with the first portion 36, the three dimensional baffling features 54 engage each other to define the air pockets 50 and baffles 52. Accordingly, the air pockets 50 and baffles 52 are formed when the second portion 38 is rotated into engagement with the first portion 36. It should be appreciated that each of the first portion 36 and the second portion 38 may be formed to define multiple three dimensional baffling features 54 to cooperate with each other to define multiple air pockets 50 having multiple baffles 52.

The first portion 36 defines at least on compartment opening 58 that provides fluid communication between the passenger compartment 26 and the at least one air pocket 50. The second portion 38 defines at least one valve opening 60 that provides fluid communication between the pressure relief valve 28 and the at least one air pocket 50. As such, the valve opening 60 in the second portion 38 is disposed adjacent the pressure relief valve 28. The compartment opening 58 and the valve opening 60 are disposed in fluid communication with each other via the at least one air pocket 50. Accordingly, air moves from the passenger compartment 26, through the compartment opening 58, through the air pocket 50, through the valve opening 60, and exits through the pressure relief valve 28. The baffles 52 are designed within the air pocket 50 to deflect and/or deaden noise that may enter the passenger compartment 26 through the pressure relief valve 28 and or through the wall 24 of the body 22.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An acoustic insulator assembly for disposition adjacent a rear wall of a vehicle body, between the rear wall and a trim panel, the acoustic insulator assembly comprising:
    a substrate formed as a single unit from an acoustic fiber, wherein the substrate includes a first portion, a second portion and a living hinge interconnecting the first portion and the second portion;
    wherein the second portion is rotatable about the living hinge into interlocking engagement with the first portion to define at least one air pocket with at least one baffle for limiting sound intrusion.

2. An acoustic insulator assembly as set forth in claim 1 wherein at least one of the first portion and the second portion defines at least one three dimensional baffling feature that extends away from a plane of the substrate, wherein the at least one three dimensional baffling feature at least partially forms the at least one baffle when the second portion is rotated into interlocking engagement with the first portion about the living hinge.

3. An acoustic insulator assembly as set forth in claim 1 wherein the acoustic insulator assembly includes an acoustic fiber including one of a synthetic spun fiber or a cotton resonated fiber.

4. An acoustic insulator assembly as set forth in claim 1 wherein the first portion defines an attachment depression, and wherein the second portion defines an attachment notch sized to tightly fit within the attachment depression of the first portion to define the interlocking engagement between the first portion and the second portion and secure the second portion relative to the first portion.

5. An acoustic insulator assembly as set forth in claim 1 wherein the first portion defines at least one compartment opening in fluid communication with the at least one air pocket.

6. An acoustic insulator assembly as set forth in claim 5 wherein the second portion defines at least one valve opening in fluid communication with the at least one air pocket.

7. An acoustic insulator assembly as set forth in claim 6 wherein the compartment opening and the valve opening are disposed in fluid communication with each other via the at least one air pocket.

8. An acoustic insulator assembly as set forth in claim 1 wherein the at least one baffle is configured to deflect and minimize the flow of noise through the at least one air pocket.

* * * * *